United States Patent
Morel-Fourrier et al.

(12) 
(10) Patent No.: US 6,265,490 B1
(45) Date of Patent: *Jul. 24, 2001

(54) PHENOL/DIENE NOVOLAC RESINS, PROCESS OF PREPARATION AND RUBBER-BASED COMPOSITIONS CONTAINING THE SAID RESINS

(75) Inventors: Christophe Morel-Fourrier, Paris; Thierry Dreyfus, Margny-les-Compiegne; Messaoud Bekhiekh, Ribecourt, all of (FR); Bonnie L. Stuck, Uniontown, OH (US)

(73) Assignee: Ceca, S.A., Puteaux (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/828,424

(22) Filed: Mar. 28, 1997

(30) Foreign Application Priority Data

Mar. 29, 1996 (FR) .................................................. 96 03971

(51) Int. Cl.[7] ............................ C08L 27/00; C08L 15/00; C08G 63/82; C08C 19/00
(52) U.S. Cl. ........................ 525/149; 525/191; 525/215; 525/219; 528/205; 528/219
(58) Field of Search .............................. 528/86, 205, 219; 525/149, 216, 219

(56) References Cited

U.S. PATENT DOCUMENTS

| 4,460,753 | * | 7/1984 | Yamamoto et al. | 528/205 |
| 4,795,778 | * | 1/1989 | Bond et al. | 525/292 |
| 4,889,891 | | 12/1989 | Durairaj et al. . | |
| 5,110,872 | * | 5/1992 | Sasaki et al. | 525/216 |

FOREIGN PATENT DOCUMENTS

| 4001606 | 7/1991 | (DE) . |
| 419741 | 4/1991 | (EP) . |
| 602861 | 6/1994 | (EP) . |
| 2193046 | 3/1974 | (FR) . |
| 2223391 | 11/1974 | (FR) . |
| 2392049 | 1/1979 | (FR) . |
| 62-004720 | 1/1987 | (JP) . |

OTHER PUBLICATIONS

Industrial Engineering Chemistry 38: 381–386 (1946).
French search report FA 526470 in French patent application FR 9603971 (Jan. 10, 1997).
Chemistry of Synthetic High Polymers. 27(3), 207–13, Japan (1984).

* cited by examiner

*Primary Examiner*—Tae Yoon
(74) *Attorney, Agent, or Firm*—Smith Gambrell & Russell LLP

(57) ABSTRACT

The invention relates to novolac resins obtained by condensation (A) of an aromatic compound containing at least two hydroxyl groups and (B) of an unconjugated diene in an (A)/(B) molar ratio of between 0.7 and 1.75 in the presence of an acidic catalyst, which are characterized in that the content of free aromatic compound is lower than 5% by weight. Also disclosed are a process for the preparation of the resins, and rubber-based compositions including from 0.5 to 20 parts by weight of the above mentioned novolac resins per 100 parts by weight of rubber. The invention also relates to the use of the resins or rubber-based compositions in the field of vulcanization, especially of tires and of conveyor belts.

11 Claims, No Drawings

PHENOL/DIENE NOVOLAC RESINS, PROCESS OF PREPARATION AND RUBBER-BASED COMPOSITIONS CONTAINING THE SAID RESINS

FIELD OF THE INVENTION

The invention relates to novolac resins obtained by condensation of an aromatic compound containing at least two hydroxyl groups and of an unconjugated diene, to the process for their preparation and to their use for improving the adherence between rubber and reinforcing materials. More particularly the invention relates to novolacs which exhibit substantially no smoke or hygroscopicity and which have good adherence properties when they are employed for vulcanizing rubber and reinforcing materials.

BACKGROUND OF THE INVENTION

With the aim of improving adherence, it is known to incorporate into rubber a formaldehyde acceptor such as a meta-substituted phenol (for example resorcinol or an m-aminophenol) and a formaldehyde donor capable of producing formaldehyde by heating in the rubber.

The abovementioned m-substituted phenols are very volatile. Also, when employed to improve the adherence of rubbers, they release noxious fumes at the vulcanization temperature (generally higher than 110° C.).

In addition, these formaldehyde acceptors are hygroscopic, and this leads to the formation of efflorescence in the rubber mixes during storage. Such efflorescence causes nonuniform adherence between the rubber and the reinforcing material, and this is detrimental to the quality of the vulcanized articles.

To solve these problems it has been proposed to employ a "resorcinol resin" as formaldehyde acceptor, which resin is obtained by condensation of resorcinol with formaldehyde (Industrial Engineering Chemistry, pp. 381–386 (1946)).

Although the resin makes it possible at the same time to obtain a high adherence and an improvement in the physical properties of the rubber (hardness and modulus), it exhibits such a state of deliquescence that it adheres packaging materials or forms a block. It is obvious that this presents many problems during storage or handling. In addition, the resin contains a large quantity of free resorcinol ($\geq 15\%$), and this does not make it possible to solve the disadvantages linked with the presence of smoke and with lump formation.

In EP-A-419 741 and DE-A-4 001 606 it has been proposed to employ modified novolacs resulting from the cocondensation of a phenol (for example resorcinol), of an unsaturated hydrocarbon (for example styrene) and of an aldehyde (for example formaldehyde).

Ternary products of cocondensation of a phenol such as resorcinol, of an alkylphenol and of an aldehyde have also been proposed. For example, in FR 2 193 046, FR 2 223 391, FR 2 392 049 and EP-A-602 861 the said products are obtained by condensation of a resol (alkylphenol/formalin) with resorcinol in the presence of an acidic catalyst.

U.S. Pat. No. 5,030,692 describes the synthesis of a ternary compound by condensation of resorcinol with a resol obtained by reaction of an alkylphenol and of methylformcel or of furfural in acidic medium.

In the ternary products which have just been mentioned, while the free resorcinol content is undoubtedly low (<5%), it is sometimes accompanied by a loss in the reactivity towards the formaldehyde donor.

JP 62004720 describes novolak resins obtained by condensation of resorcinol in exces with dicyclopentadiene (resorcinol/dicyclopentadiene molar ratio=2.9), the exces of resorcinol at the end of the reaction being removed for example by reduced pressure distillation or fractional precipitation. These resins have enhanced heat resistance and flexibility that render them appreciated in the field of electronic materials.

Despite the disclosures of the prior art, there remains a need to obtain resins which do not produce smoke or lump formation and which are found to be as reactive as the resorcinol/formalin resins when rubber is vulcanized.

DESCRIPTION OF THE INVENTION

The subject-matter of the present invention is novolac resins obtained by condensation (A) of an aromatic compound containing at least two hydroxyl groups and (B) of an unconjugated diene, the said resins exhibiting a free aromatic compound content lower than 5% by weight.

Another subject-matter of the invention concerns a process for the preparation of the abovementioned resins, which consists in reacting the compound (A) and the diene (B) in an (A)/(B) molar ratio of between 0.7 and 1.75 in the presence of an acidic catalyst, and optionally in distilling.

Another subject-matter of the invention further concerns rubber-based compositions containing the abovementioned resins.

Another subject-matter of the invention concerns, lastly, the use of these resins as adhesion-promoter agent improving the adherence of the rubber to the reinforcing materials.

Other subject-matters and advantages of the invention will appear in the light of the following description.

The novolac resins according to the invention are obtained by condensation (A) of an aromatic compound containing at least two hydroxyl groups and (B) of an unconjugated diene in an (A)/(B) molar ratio of between 0.7 and 1.75 in the presence of an acidic catalyst.

The aromatic compound is generally chosen from monoaromatic compounds such as resorcinol, pyrocatechol, hydroquinone, pyrogallol and phloroglucinol, and the compounds of formula:

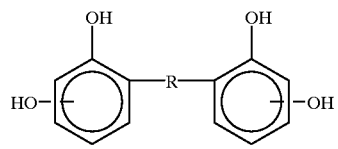

in which R denotes an alkylene or arylalkylene radical containing 1 to 12 carbon atoms.

The aromatic compound may consist of only one or of a number of the abovementioned compounds. Resorcinol is preferably employed.

The aromatic compound may additionally contain up to 25 mol % of at least one other phenol, substituted or otherwise, chosen, for example, from alkylphenols in which the alkyl radical contains from 1 to 14 carbon atoms and catechu oil.

The unconjugated diene according to the invention is generally chosen from the adducts obtained by a Diels-Alder reaction from at least two conjugated dienes such as butadiene, isoprene, piperylene, cyclopentadiene and methylcyclopentadiene. Examples of such compounds which may be mentioned are dicyclopentadiene, dimethyldicyclopentadiene, dipentene, norbornadiene, the oligomers and cooligomers of the abovementioned conjugated dienes and mixtures of these compounds.

Unconjugated dienes containing from 8 to 25 carbon atoms are preferably employed.

Advantageously, a diene containing from 75 to 100% by weight of at least one dimer such as dicyclopentadiene and 0 to 25% by weight of at least one other dimer, codimer, trimer and/or cotrimer is employed.

Better still, the diene includes 75% by weight of dicyclopentadiene and 25% by weight of at least one codimer chosen from cyclopentadiene-piperylene, cyclopentadiene-isoprene and cyclopentadiene-methylcyclopentadiene.

The unconjugated diene may additionally contain up to 25 mol % of at least one compound chosen from aliphatic olefins, for example diisobutylene, isobutylene or amylene or branched olefins containing a $C_6$–$C_{14}$ alkyl, aryl or alkylaryl radical, for example tyrene, alpha-methylstyrene or vinyltoluene.

The acidic catalyst is generally chosen from acids of Lewis type, such as alkylsulphonic, arylsulphonic, alkylarylsulphonic, phenolsulphonic, alkylphenolsulphonic and aryldisulphonic acids and the mixtures of these acids, and $BF_3$, gaseous or in the form of complexes with a phenol, an alcohol or an acid, especially acetic.

An acidic catalyst chosen from Friedel and Crafts acids, such as sulphuric acid, can also be employed.

The quantity of acid used is generally between 0.5 and 5% by weight, relative to the weight of the reactants (A) and (B).

The molar ratio of the compound (A) to the compound (B) is preferably between 0.75 and 1.25. When the molar ratio is lower than 0.7 gelling of the resin is generally observed.

The condensation of the compounds (A) and (B) in the presence of the catalyst is carried out at a temperature which can vary from 50 to 130° C. To control the reaction exotherm it is preferred to operate at the reflux of the volatile compounds and optionally in the presence of a solvent, especially an aromatic hydrocarbon such as toluene or xylene, or an aliphatic one such as hexane.

In a preferred alternative form the compound (B) is introduced continuously into the mixture consisting of the compound (A) and the catalyst and, optionally, the solvent.

At the end of the reaction the novolac resin is recovered, optionally after a distillation stage, preferably under vacuum, for example between 30 and 100 mm Hg and at 200° C. The resin, generally of black, red or violet colour, has a ring-and-ball melting point (NFT standard 76106) of between 80 and 130° C. and preferably 90 and 110° C., and a free aromatic compound content lower than 5% and preferably 1%. In addition, the said resin does not present any problem of lump formation when placed in a damp atmosphere.

The resins obtained according to the process described above unexpectedly retain the hydroxyl groups of the starting aromatic compound, permitting good reactivity with the formalin donor. This does not form part of the prior art, which teaches the formation of novolac resins based on dicyclopentadiene and a phenol by O-alkylation reactions (see CA 101(6):38928a, 1984).

The novolac resins according to the invention are found to be particularly efficient for improving the adherence of rubber to reinforcing materials such as organic, especially nylon-, rayon-, polyester-, polyamide- or aramid-based fibres and metal cords based on steel, especially brass- or zinc-plated.

The resins according to the invention can be advantageously incorporated into rubber-based compositions. Such compositions are characterized in that they include from 0.5 to 20 parts by weight, and preferably from 1 to 10 parts by weight, of the said resins per 100 parts by weight of rubber.

The rubber is generally chosen from natural rubber, styrene-butadiene copolymers, polybutadiene, butadiene-acrylonitrile copolymers and their hydrogenated derivatives, polychloroprene, butyl or halogenated butyl rubber, polyisoprene and blends of two or more of these compounds.

The abovementioned compositions are generally crosslinked by means of a formaldehyde donor which is known in the field. Examples which may be mentioned are hexamethoxymethylolmelamine, advantageously adsorbed on silica, and hexamethylenetetramine. The formalin donor is generally employed in a proportion of 0.5 to 10 parts by weight, and preferably 1 to 5 parts by weight, per 100 parts by weight of rubber.

The abovementioned compositions may furthermore contain various additives, especially (in parts by weight per 100 parts by weight of rubber):

inorganic reinforcing fillers such as carbon black (20–120 parts), silica (3–50 parts), calcium carbonate and black/silica mixtures, accelerators, catalysts and/or vulcanization retarders, antioxidants, antiozonants and/or antidegradants for stabilizing the compositions, peptizers, so-called process oils, tackifying resins, lubricants and/or plasticizers for carrying out the compounding, and adhesion-promoter coagents such as organic cobalt salts, complex salts of cobalt and boron, and lead oxides intended to improve the adhesion of the rubber to metal cords. In general from 0.1 to 5 parts are employed, calculated on the basis of the cobalt or lead.

The vulcanization conditions depend on the nature of the rubber and of the compounding additives. In themselves, these conditions are not critical and they form part of the general knowledge of a person skilled in the art.

These compositions may be advantageously used for the manufacture of tyres and of vulcanized conveyor belts.

EXAMPLES

The examples which follow make it possible to illustrate the invention.

Example 1

30 g of toluene and 150 g of resorcinol (Indspec) are introduced into a two-liter three-necked round bottom flask fitted with a stirrer and a condenser. The flask is heated to 100° C. and 1 g of 96% sulphuric acid is added (that is 0.66% by weight relative to the resorcinol). Into these are poured, over one hour, 239 g of a mixture containing 75% by weight of dicyclopentadiene and 25% by weight of codimers obtained by a Diels-Alder reaction from cyclopentadiene and $C_4$–$C_6$ diolefins (Resin Grade; Dow). The resorcinol/diene molar ratio is 0.75.

An exotherm is observed: the temperature increases to 125° C., to fall back to 110° C. at the end of pouring. The reaction mixture becomes red. The mixture is then heated to 120–130° C. for 2 hours.

The resin obtained has a ring-and-ball melting point of 85° C. and a free resorcinol content of 2.6% by weight. After neutralization of the mixture by the addition of 1.7 g of triethanolamine, the condenser is placed in a position for distillation, and distillation is carried out up to 200° C. at a reduced pressure of 30 mm Hg. 35 g of distillate and 385 g of a resin exhibiting a ring-and-ball melting point of 108° C. and containing 2% by weight of free resorcinol are recovered. Analysis of the resin by gel permeation chromatography (gel: Shodex H 2002, eluent: THF, detection: differential refractometry, calibration: polystyrene) indicates a weight molecular mass of 944 and a polydispersity value of 1.84.

Example 2

30 g of toluene and 150 g of resorcinol (Indspec) are introduced into the device of Example 1. The flask is heated to 100° C. and 4.5 g of $BF_3$ complexed with acetic acid are added (that is 3% by weight of $BF_3$ relative to the resorcinol). Into these are poured, over 30 minutes, 180 g of a mixture containing 75% by weight of dicyclopentadiene and 25% by weight of codimers obtained by a Diels-Alder reaction from cyclopentadiene and $C_4$–$C_6$ diolefins (Resin Grade; Dow). The resorcinol/diene molar ratio is 1.

The mixture obtained is heated to 120–130° C. for 5 hours. The condenser is placed in the position for distillation and the reaction mixture is distilled at 150° C. at a reduced pressure of 10 mm Hg. 315 g of a black resin exhibiting a ring-and-ball melting point of 104° C. and containing 3.8% by weight of free resorcinol are recovered.

The infrared spectrum of a KBr disc containing 10% by weight of the resin obtained exhibits an intense absorption band characteristic of the hydroxyl functional group, as well as a band at 3041 $cm^{-1}$, attributable to ethylenic bonds. Gel permeation chromatography analysis (conditions of Example 1) indiates a weight molar mass of 757.

Example 3

39 g of toluene and 195 g of resorcinol (Indspec) are introduced into the device of Example 1. The flask is heated to 100° C. and 1.3 g of 96% sulphuric acid are added (that is 0.66% by weight relative to the resorcinol). 234 g of dicyclopentadiene (Prolabo) are poured in over one hour. The resorcinol/dicyclopentadiene-molar ratio is 1.

An exotherm is noted: the temperature increases to 128° C., to fall back to 120° C. at the end of pouring. The reaction mixture becomes red. The mixture is then heated to 120–130° C. for 2 hours.

After neutralization of the mixture by the addition of 1.9 g of triethanolamine the condenser is placed in a position for distillation, and distillation is carried out up to 200° C. at a reduced pressure of 30 mm Hg. Approximately 36 g of distillate and 424 g of a resin exhibiting a ring-and-ball melting point of 144° C. and containing 4.3% by weight of free resorcinol are recovered.

When mixed with 10% by weight of hexamethylenetetramine, this resin exhibits a crosslinking time on a hot plate at 150° C. of 100 seconds (NF standard T51 428).

Example 4

40 g of toluene and 195 g of pyrocatechol (Prolabo) are introduced into the device of Example 1. They are heated to 100° C. and 2.6 g of 96% sulphuric acid are added (that is 1.33% by weight relative to the pyrocatechol). 234 g of dicyclopentadiene (Prolabo) are poured in over one hour. The pyrocatechol/dicyclopentadiene molar ratio is 1.

An exotherm is noted: the temperature increases to 132° C., to fall back to 124° C. at the end of the pouring. The reaction mixture becomes violet. the mixture is then heated to 120–130° C. for 2 hours.

After neutralization of the mixture by the addition of 3.7 g of triethanolamine the condenser is placed in a position for distillation, and distillation is carried out up to 200° C. at a reduced pressure of 30 mm Hg. Approximately 36 g of distillate and 429 g of a blackish resin exhibiting a ring-and-ball melting point of 124° C. and containing 4.5% by weight of free pyrocatechol are recovered.

The infrared spectrum of a KBr disc containing 10% by weight of the resin obtained exhibits an intense band at 3442 $cm^{-1}$, characteristic of the hydroxyl functional group.

When mixed with 10% by weight of hexamethylenetetramine, this resin exhibits a crosslinking time on a hot plate at 150° C. of 110 seconds (NF standard T51 428).

Example 5 (Comparative)

200 g of phenol (purity>99.85%) are introduced into the device of Example 1 and are heated to 100° C. 4 g of a solution containing 50% by weight of octylphenolsulphonic acid in xylene are added (that is 1% by weight relative to the phenol). Into these are poured, over one hour, 188 g of a mixture containing 75% by weight of dicyclopentadiene and 25% by weight of codimers obtained by a Diels-Alder reaction from cyclopentadiene and $C_4$–$C_6$ diolefins (Resin Grade; Dow). The phenol/diene molar ratio is 1.5.

The mixture is heated to 100–110° C. for 5 hours. At the end of the reaction a liquid black resin containing 22% by weight of free phenol is recovered and is chromatographed on a silica column (tetrahydrofuran/hexane gradient 10/90 to 20/10, v/v). 150 g of a compound are recovered and its analysis is carried out by $^1H$ NMR (200 MHz):

| Proton type | Chemical shift (ppm) | Proton number (per integration) |
| --- | --- | --- |
| aromatic | 6.87 and 7.25 | 5 |
| vinyl | 5.45 and 5.7 | 2 |
| ether (C$\underline{H}$—O) | 4.21 | 1 |
| aliphatic | 1.29–2.59 | 12 |

The $^1H$ NMR spectrum of this compound shows the presence of ether bonds resulting from the condensation, by O-alkylation, of one molecule of phenol and of one molecule of dicyclopentadiene.

Example 6 (Comparative)

100 g of phenol (purity >99.85%) are introduced into the device of Example 1 and are heated to 100° C. 2 g of $BF_3$ complexed with acetic acid are introduced (that is 2% by weight relative to the phenol). Into these are poured, over one hour, 188 g of a mixture containing 75% by weight of dicyclopentadiene and 25% by weight of codimers obtained by a Diels-Alder reaction from dicyclopentadiene and $C_4$–$C_6$ diolefins (Resin Grade; Dow). The phenol/diene molar ratio is 0.75.

The mixture is heated to 120–130° C. for 5 hours. The condenser is placed in a position for distillation and the mixture is distilled up to 200° C. at a reduced pressure of 10 mm Hg. 252 g of soft black resin (ring-and-ball melting point =54° C.) containing no free phenol are recovered. The $^1H$ NMR spectrum of this resin is similar to that of the resin according to Example 1 and, in addition, exhibits a signal at 4.75 ppm, corresponding to a mobile proton. This signal, which disappears when trifluoroacetic acid is added, is attributed to the proton of hydroxyl functional groups.

Example 7 (Comparative)

The operation is carried out in the conditions of Example 6, modified in that 94 g of the mixture based on dicyclopentadiene (Resin Grade; Dow) are employed, that is a phenol/diene molar ratio of 1.5. A soft black resin containing less than 1% of free phenol is obtained.

100 parts of the resin thus obtained and 10 parts by weight of hexamethylenetetramine are mixed and heated to 170° C. for 25 minutes. It is found that the mixture remains liquid and that its viscosity is not increased.

From this it is concluded that the presence of phenolic ethers in the resin does not allow the reaction with the formalin-donor.

By way of comparison, a mixture containing 100 parts by weight of phenol/formalin novolac resin (R7515, Ceca S.A., phenol/formalin molar ratio: 1.5, free phenol content: 1%) and 10 parts by weight of hexamethylenetetramine crosslinks in less than 2 minutes at 170° C.

Examples of Application

The following measurements are performed in all the examples:

1) Rheological Properties

"Mooney Scorch time" (min), measured at 120° C. with a Monsanto MV 2000E viscometer according to ISO method 289 1, Mooney viscosity (ml), measured at 100° C. with a Monsanto NV 2000E viscometer according to ISO method 289 1, Rheological curve produced at 150° C. with an MDR 2000 rheometer, 1° arc according to ISO method 289 2.

The prevulcanization characteristics are measured:

---
T95: time (min) to obtain 95% of the maximum force
Tangent δ measured at T95
N max.: Maximum force (dNm)
---

2) Mechanical Properties According to ISO 37, DIN 53 505 at 150° C.

---
Modulus at 300% (MPa)
Modulus of elongation (MPa)
Maximum elongation (%)
Shore A hardness
---

The abovementioned properties are measured: a) for an optimum vulcanization at 150° C., and b) for an overvulcanization of 100 minutes at 150° C.

Mechanical properties after aging according to ISO 188 after 72 hours at 70° C. or 72 hours at 100° C.:

---
Modulus of elongation (MPa)
Maximum elongation (%)
Shore A hardness
Shear strength (kN/m) at 90° C. according
---

3) Rubber/Steel Cords Adherence Properties

A) Adherence to brass-plated steel cords (tire application)

According to ISO 5603

The adherence of the rubber to single brass-plated steel cords consisting of 4 strands of 0.28 mm diameter (4*0.28) or a complex consisting of a central wire of 0.15 mm diameter and 7 peripheral strands including 4 wires of 0.2 mm diameter (7*4*0.22+1*0.15) is measured in the following vulcanization and aging conditions:

Vulcanization time: optimum+5 minutes

Vulcanization time: optimum+5 minutes and aging 10 days at 75° C. and 90% humidity Vulcanization time: optimum+5 minutes and aging 24 hours at 90° C. in an aqueous solution of NaCl at a concentration of 5% by weight (only in the case of the 7*4*0.22+1*0.15 cords).

Overvulcanization: 150 minutes at 150° C.

According to the Henley method (CSN-standard 62 1464)

The adherence of the rubber to the cords is measured before and after alternating mechanical stressing (24 hours at 80° C. at an angle of 45° with a frequency of 7.5 Hz).

B) Adherence to zinc-plated steel cords (conveyor belt application)

The adherence of the rubber to a zinc-plated cord of 2.8 mm diameter, consisting of 7 peripheral strands including 7 wires of 0.31 mm diameter (7*7*0.31) is measured in the following vulcanization and aging conditions:

Vulcanization time: optimum+5 minutes

Vulcanization time: optimum+5 minutes and aging 150 minutes at 145° C.

Examples 8 to 11

Adherence to brass-plated steel cords, application to tyres.

The rubber mix of the following composition is employed:

| | Parts by weight |
|---|---|
| 1 Premasticated RSS-1 natural rubber | 100 |
| 2 N-326 carbon black | 60 |
| 3 Zinc oxide | 6 |
| 4 Stearic acid | 0.6 |
| 5 Naphthenic oil (Enerflex 65; BP) | 6 |
| 6 Precipitated silica (Ultrasil VN3; Degussa) | 5 |
| 7 Polymerized 2,2,4-trimethyl-1,2-dianhydroquinoline (TMQ-Flectol; Monsanto) | 2 |
| 8 Tackifying resin (R7510; Ceca) | 1 |
| 9 Insoluble sulphur (Crystex OT 20A; Kali Chemie) | 5.5 |
| 10 N,N'-Dicyclohexyl-2-benzothiazolyl-sulphenamide (Vulkacit DZ DCBS) | 1 |
| 11 Hexamethoxymethylolmelamine adsorbed on silica containing 65% of active material (R7234; Ceca) | 2 |
| 12 Adhesion-promoter resin* | 2 |

*Control without resin (Example 8; comparative) Penacolite B20S resorcinol/formalin resin; Indspec (Example 9; comparative) Resorcinol (Example 10; comparative) Resin obtained according to Example 1 (Example 11).

The following constituents are introduced into a Banbury-type internal mixer: 1 (at time t), half the weight of 2 and 5 (at t+1 min), the remainder of 2, 6 and 12 (at t+2 min), 3, 7, 4 and 8 (at t+3 min). The mix is discharged at t+5 min.

The following constituents are introduced onto a twin-roll external mixer (roll mill): the mix obtained above (at time t), 11 (at t+1 min), 10 (at t+2 min) and 9 (at t+3 min). The mix thus obtained (at t+6 min) is homogenized over 12 passes and discharged (at t+10 min).

The results are collated in the following tables:

|  | Example 8 (comparative) | Example 9 (comparative) | Example 10 (comparative) | Example 11 |
|---|---|---|---|---|
| 1) Rheological properties | | | | |
| Mooney Scorch time (min) | 22.42 | 26.24 | 20.16 | 26.2 |
| Mooney viscosity (ml) | 77.3 | 75.0 | 74.1 | 81.3 |
| T95 (min) | 30.80 | 32.44 | 22.57 | 35.82 |
| Tangent δ | 0.079 | 0.097 | 0.093 | 0.087 |
| N max. (dNm) | 21.84 | 24.24 | 24.57 | 23.72 |
| 2) Mechanical properties Optimum vulcanization at 150° | | | | |
| Modulus of elongation (MPa) | 21.15 | 20.80 | 21.70 | 22.70 |
| Modulus at 300% (MPa) | 10.25 | 10.91 | 10.60 | 12.03 |
| Maximum elongation (%) | 543 | 524 | 534 | 526 |
| Shore A hardness | 68.5 | 75.6 | 75.5 | 75.0 |
| Shear at 20° C. (kN/m) | 93 | 87 | 92 | 81 |
| Shear at 90° C. (kN/m) | 57 | 62 | 60 | 62 |
| Overvulcanization 100 min at 150° C. | | | | |
| Modulus of elongation (MPa) | 21.5 | 21.0 | 20.9 | 21.4 |
| Maximum elongation (%) | 454 | 409 | 424 | 446 |
| Modulus at 300% (MPa) | 13.96 | 15.91 | 14.92 | 14.35 |
| Shore A hardness | 75 | 81 | 78 | 79 |
| Aging 72 hours at 70° C. | | | | |
| Modulus of elongation (MPa) | 24.80 | 23.30 | 24.60 | 23.45 |
| Maximum elongation (%) | 493 | 477 | 468 | 484 |
| Shore A hardness | 71 | 76 | 72 | 76 |
| Aging 72 hours at 100° C. | | | | |
| Modulus of elongation (MPa) | 6.59 | 6.51 | 7.86 | 6.36 |
| Maximum elongation (%) | 109 | 113 | 118 | 95 |
| Shore A hardness | 79 | 79 | 80 | 80 |
| 3) Adherence properties ISO standard 5603 | | | | |
| 4*0.28 cords (N/cm) | | | | |
| Optimum vulcanization + 5 min | 281 | 318 | 298 | 296 |
| After aging 10 days at 75° C. and 90% humidity | 320 | 243 | 277 | 308 |
| Overvulcanization 150 min at 150° C. | 337 | 347 | 301 | 355 |
| 7*4*0.22+1*0.15 cords (N/2.5 cm) | | | | |
| Optimum vulcanization + 5 min | 810 | 876 | 972 | 931 |
| After aging 10 days at 75° C. and 90% humidity | 1242 | 1172 | 1078 | 1207 |
| After aging 24 hours at 90° C. in 5% NaCl solution | 618 | 447 | 523 | 465 |
| Overvulcanization 150 min at 150° C. | 953 | 1084 | 1066 | 1170 |
| CSN standard 62 1464 | | | | |
| 4*0.28 cords | | | | |
| Optimum vulcanization + 5 min | | | | |
| Before alternating deformation (N) | 191.8 | 254.5 | 216.7 | 268.6 |
| After alternating deformation (N) | 158.5 | 202.0 | 183.1 | 207.8 |
| Loss (%) | 17.3 | 20.6 | 15.5 | 22.6 |
| Overvulcanization 150 min at 150° C. | | | | |
| Before alternating deformation (N) | 224.5 | 286.3 | 249.8 | 232.2 |
| After alternating deformation (N) | 189.5 | 251.8 | 220.8 | 226.3 |
| Loss (%) | 15.6 | 12.1 | 11.8 | 2.6 |
| 7*4*0.22+1*0.15 cords | | | | |
| Optimum vulcanization + 5 min | | | | |
| Before alternating deformation (N) | 315.3 | 332.3 | 351.8 | 344.2 |
| After alternating deformation (N) | 283.5 | 296.5 | 306.0 | 304.5 |
| Loss (%) | 10.1 | 10.8 | 13.0 | 11.5 |
| Overvulcanization 150 min at 150° C. | | | | |
| Before alternating deformation (N) | 328.6 | 379.6 | 338.0 | 314.2 |
| After alternating deformation (N) | 291.5 | 330.0 | 304.8 | 308.5 |
| Loss (%) | 11.3 | 4.4 | 9.8 | 1.8 |

Examples 12 to 15

Adherence to zinc-plated steel cords, application to conveyor belts.

The rubber mix of the following composition is employed:

|  |  | Parts by weight |
|---|---|---|
| 1 | SMR-GP natural rubber | 42 |
| 2 | SBR 1500 synthetic rubber | 31.2 |
| 3 | SKD polybutadiene rubber | 26.8 |
| 4 | N-330 carbon black | 40 |
| 5 | Zinc oxide | 17 |
| 6 | Stearic acid | 0.6 |
| 7 | Naphthenic oil (Enerflex 65; BP) | 5.5 |
| 8 | Precipitated silica (Ultrasil VN3; Degussa) | 9 |
| 9 | Polymerized 2,2,4-trimethyl-1,2-dianhydroquinoline (TMQ-Flectol; Monsanto) | 1 |
| 10 | Insoluble sulphur (Crystex OT 20A; Kali Chemie) | 4 |
| 11 | N-Cyclohexyl-2-benzotriazolylsulphenamide (Sulfenax; Istrochem) | 0.8 |
| 12 | Antiozonant (Santoflex 13; Monsanto) | 1.8 |
| 13 | Lead oxide (Rhenogran PbO 80; Rheinchemie) | 1.8 |
| 14 | Antidegradant (Santogard PVI; Monsanto) | 0.13 |
| 15 | Cobalt naphthenate (Servo) | 4.5 |

-continued

|   | Parts by weight |
|---|---|
| 16 Hexamethoxymethylolmelamine adsorbed on silica containing 65% of active material (R7234; Ceca) | 2.7 |
| 17 Adhesion-promoter resin* | 3 |

*Control without resin (Example 12; comparative) Resorcinol/formalin resin (Penacolite B20S; Indspec) (Example 13; comparative) Resorcinol (Example 14; comparative)

Resin obtained according to Example 1 (Example 15)

The following constituents are introduced into a Banbury-type internal mixer: 1 and 2 (at time t=0), ⅔ of the weight of 4 (at t+1 min), ⅔ of the weight of 5 (at t+2 min), mix A obtained is discharged (at t+4 min) and is left to cool.

The mix A and the following constituents are introduced into the abovementioned mixer: 3 (at time t=0), the remainder of 4, 8 and 7 (at t+1 min), the remainder of 5 and 17 (at t+2 min), 15, 9, 12, 13 and 6 (at t+3 min) and the mix B obtained is discharged (at t+5 min).

Onto a twin-roll external mixer (roll mill) are introduced the mix B (at time t=0) and the following constituents: 11 (at t+1 min), 16 (at t+2 min) and 10 and 14 (at t+3 min). The mix is discharged at t+6 minutes. The mix thus obtained is homogenized and discharged after 10 minutes' blending.

The results are collated in the following tables:

|   | Example 12 (comparative) | Example 13 (comparative) | Example 14 (comparative) | Example 15 |
|---|---|---|---|---|
| 1) Rheological properties |   |   |   |   |
| Mooney Scorch time (min) | 48.7 | 33.0 | 22.3 | 44.6 |
| Mooney viscosity (ml) | 52.8 | 56.5 | 53.6 | 57.0 |
| T95 (min) | 14.68 | 15.70 | 15.45 | 15.37 |
| Tangent δ | 0.038 | 0.066 | 0.077 | 0.064 |
| N max. (dNm) | 23.37 | 25.98 | 28.51 | 25.36 |
| 2) Mechanical properties Optimum vulcanization at 150° |   |   |   |   |
| Modulus of elongation (MPa) | 15.54 | 17.40 | 17.83 | 16.88 |
| Modulus at 300% (MPa) | 11.43 | 11.81 | 12.12 | 11.77 |
| Maximum elongation (%) | 381 | 415 | 420 | 418 |
| Shore A hardness | 69.0 | 73.0 | 73.5 | 73.0 |
| Shear at 20° C. (kN/m) | 35.3 | 36.1 | 40.9 | 38.3 |
| Shear at 90° C. (kN/m) | 24.0 | 26.5 | 28.5 | 21.3 |
| Overvulcanization 100 min at 150° C. |   |   |   |   |
| Modulus of elongation (MPa) | 16.34 | 16.07 | 15.87 | 15.15 |
| Maximum elongation (%) | 449 | 398 | 400 | 368 |
| Modulus at 300% (MPa) | 9.81 | 11.55 | 11.48 | 11.40 |
| Shore A hardness | 70.0 | 74.5 | 74.5 | 73.5 |
| Aging 72 hours at 70° C. |   |   |   |   |
| Modulus of elongation (MPa) | 15.53 | 14.82 | 15.56 | 17.17 |
| Maximum elongation (%) | 299 | 293 | 327 | 338 |

-continued

|   | Example 12 (comparative) | Example 13 (comparative) | Example 14 (comparative) | Example 15 |
|---|---|---|---|---|
| Shore A hardness | 74.0 | 77.5 | 77.0 | 77.0 |
| Aging 72 hours at 100° C. |   |   |   |   |
| Modulus of elongation (MPa) | 10.54 | 11.31 | 11.64 | 11.39 |
| Maximum elongation (%) | 117 | 130 | 132 | 126 |
| Shore A hardness | 75 | 85 | 84 | 84 |
| 3) Adherence properties on 7*7*0.31 2.8 diameter cords |   |   |   |   |
| Optimum vulcanization + 5 min (N/50 mm) | 5100 | 5965 | 6040 | 5595 |
| Overvulcanization 150 min at 150° C. (N/50 mm) | 3380 | 5515 | 5711 | 5111 |
| Loss (%) | 33.7 | 7.5 | 5.4 | 8.7 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Rubber-based composition comprising from 0.5 to 20 parts by weight of novolac resins per 100 parts by weight of rubber selected from the group consisting of natural rubber, styrene-butadiene copolymers, polybutadiene, butadiene-acrylonitrile copolymers and hydrogenated derivatives thereof, polychloroprane, butyl or halogenated butyl rubber, polyisoprane and blends of at least two of these compounds, said novolac resins being a condensation product of a reaction of (A) an aromatic compound containing at least two hydroxyl groups and (B) an unconjugated diene in an (A)/(B) molar ratio of between 0.7 and 1.75 in the presence of an acidic catalyst, said novalac resins having a content of a free amount of said aromatic compound of lower than 5% by weight; wherein said novolac resins do not (1) produce smoke when said rubber-based compositions is vulcanized or (2) lump formation.

2. Composition according to claim 1, wherein the free aromatic compound content is lower than 1% by weight.

3. Composition according to claim 1, wherein their ring-and-ball melting point is between 80 and 130° C.

4. Composition according to claim 1, wherein the aromatic compound is selected from monoaromatic compounds and the compounds of formula:

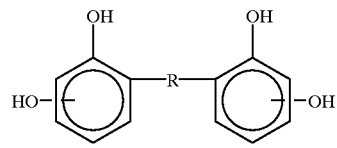

in which R denotes an alkylene or arylalkylene containing 1 to 12 carbon atoms.

5. Composition according to claim 4, wherein the monoaromatic compound is resorcinol, pyrocatechol, hydroquinone, pyrogallol or phloroglucinol.

6. Composition according to claim 1, wherein the diene is obtained by a Diels-Alder reaction from at least two conjugated dienes selected from butadiene, isoprene, piperylene, cyclopentadiene and methylcyclopentadiene.

7. Composition according to claim 6, wherein the diene contains from 8 to 25 carbon atoms.

8. Composition according to claim 1, wherein it includes from 1 to 10 parts by weight of resins per 100 parts by weight of rubber.

9. Rubber-based composition comprising from 0.5 to 20 parts by weight of novolac resins per 100 parts by weight of rubber;

said novolac resins being a condensation product of a reaction of (A) an aromatic compound selected from the group consisting of resorcinol, pyrocatechol, hydroquinone, pyrogallol and phloroglucinol and (B) an unconjugated diene obtained by a Diels-Alder reaction from at least two conjugated dienes selected from the group consisting of butadiene, isoprene, piperylene, cyclopentadiene and methylcyclopentadiene in an (A)/(B) molar ratio of between 0.7 and 1,75;

the reaction being in the presence of an acidic catalyst selected from the acids of Lewis or Friedel and Crafts, and at a temperature of from 50° C. to 130° C.;

said novolac resins having a content of a free amount of said aromatic compound of less than 5% by weight; and said rubber being selected from the group consisting of natural rubber, styrene-butadiene copolymers, polybutadiene, butadiene-acrylonitrile copolymers and hydrogenated derivatives thereof, polychloroprene, butyl or halogenated butyl rubber, polyisoprene and blends of at least two of these compounds;

wherein said novolac resins do not produce smoke when said rubber-based composition is vulcanized, and wherein said novolac resins do not exhibit hygroscopicity by producing lump formation.

10. Composition according to claim 1 wherein the condensation reaction is carried out at a temperature of from 50° C. to 130° C.

11. Composition according to claim 1 wherein said novolac resins do not exhibit hygroscopicity by producing lump formation.

* * * * *